United States Patent [19]

Kuzumaki et al.

[11] Patent Number: 6,114,459
[45] Date of Patent: Sep. 5, 2000

[54] VULCANIZABLE ACRYLIC ELASTOMER COMPOSITION INCLUDING AN ACRYLIC ELASTOMER, AN ORGANIC PEROXIDE, AND A POLYFUNCTIONAL UNSATURATED COMPOUND

[75] Inventors: Yoshihiro Kuzumaki; Eiji Komiyama, both of Kitaibaraki; Kuniyoshi Saito, Iwaki; Jun Okabe, Kitaibaraki, all of Japan

[73] Assignee: Nippon Mektron Limited, Tokyo, Japan

[21] Appl. No.: 08/969,000

[22] Filed: Nov. 12, 1997

[30] Foreign Application Priority Data

Nov. 29, 1996 [JP] Japan ..................................... 8-333049
Jan. 24, 1997 [JP] Japan ..................................... 9-024459

[51] Int. Cl.$^7$ .................................................. C08F 271/02
[52] U.S. Cl. ....................... 525/281; 525/242; 525/330.3; 525/330.7
[58] Field of Search ..................... 526/292.95; 525/330.3, 525/330.5, 330.9, 281, 242, 330.7, 330.8

[56] References Cited

U.S. PATENT DOCUMENTS 3,714,315 1/1973 Minton et al. ........................ 264/210 F
4,092,303 5/1978 Behrens .............................. 260/79.5 P
5,696,190 12/1997 Brooks .................................... 524/248

FOREIGN PATENT DOCUMENTS 7-292198 7/1995 Japan .

*Primary Examiner*—Christopher Henderson
*Attorney, Agent, or Firm*—Baker & Daniels

[57] ABSTRACT

An acrylic elastomer obtained by copolymerization of about 60 to about 99.9% by weight of at least one of alkyl acrylate and alkoxyalkyl acrylate; about 10 to about 0.1% by weight of a halogen-containing vinyl compound having a secondary or tertiary halogenoalkyl group; and about 30 to 0% by weight of a monomer copolymerizable with the acrylate and the vinyl compound, sum total being 100% by weight, is an acrylic elastomer containing the halogen-containing vinyl compound as a cross-linking site monomer capable of forming an active halogen group cross-linkable with an organic peroxide or the like, and has a high vulcanization torque.

2 Claims, 2 Drawing Sheets

VULCANIZABLE ACRYLIC ELASTOMER COMPOSITION INCLUDING AN ACRYLIC ELASTOMER, AN ORGANIC PEROXIDE, AND A POLYFUNCTIONAL UNSATURATED COMPOUND

BACKGROUND OF THE INVENTION

1. Field of the Invention

The present invention relates to an acrylic elastomer copolymerized with a halogen-containing vinyl compound and a composition containing the same, and more particularly to an acrylic elastomer copolymerized with a halogen-containing vinyl compound capable of forming cross-linkable groups on the acrylic elastomer and a composition containing the same.

2. Description of Related Art

Acrylic elastomers are widely used as vulcanization molding materials for various sealing materials, hoses, electric parts, etc. due to their distinguished heat resistance, oil resistance, etc. Acrylic elastomers for use in such applications are acrylic copolymer elastomers comprising alkyl acrylate or alkoxyalkyl acrylate as the main component, copolymerized with a small amount of a cross-linking site monomer.

In such acrylic copolymer elastomers, cross-linking reaction can be efficiently carried out with a vulcanization system selected according to the kind of the individual cross-linking site monomers. Cross-linkable groups derivable from cross-linking site monomers include, for example, an active halogen group, an epoxy group, a carboxyl group, a hydroxyl group, an amido group, a diene group, etc. The active halogen group can be introduced into the acrylic elastomer by copolymerization with such a cross-linking site monomer as 2-chloroethyl vinyl ether, vinyl chloroacetate, 2-chloroethyl acrylate, etc.

As a vulcanizing agent for these active halogen group-introduced acrylic elastomers, those of polyamine series, alkali soap/sulfur (donor compound) series, etc. can be used, but vulcanization connot be effectively attained by an organic peroxide. Thus, there is a problem of restriction to the available vulcanization systems.

SUMMARY OF THE INVENTION

An object of the present invention is to provide an acrylic elastomer having a high vulcanization torque, copolymerized with a halogen-containing vinyl compound as a cross-linking site monomer capable of forming an active halogen group cross-linkable with an organic peroxide, etc.

An acrylic elastomer according to the present invention is obtained by copolymarization of about 60 to about 99.9% by weight of at least one of alkyl acrylate and alkoxyalkyl acrylate; about 10 to about 0.1% by weight of a halogen-containing vinyl compound having a secondary or tertiary halogenoalkyl group: and about 30 to 0% by weight of a monomer copolymerizable with the acrylate and the vinyl compound, sum total being 100% by weight.

DETAILED DESCRIPTION OF THE INVENTION

As a halogen-containing vinyl compound containing a secondary or tertiary halogenoalkyl group, a compound represented by the following chemical formulae [A], [B], [C], [D], [E] or [F] can be used, for example:

$$CH_2=CRCOOR_1OCOR_2X \quad [A]$$

where
- R: a hydrogen atom or a methyl group,
- $R_1$: a hydrocarbon group or substituted hydrocarbon group having 1 to 10 carbon atoms, the substituent being a halogen atom, nitrile or the like,
- $R_2$: a secondary or tertiary hydrocarbon group having 2 to 5 carbon atoms, and
- X: a chlorine atom, bromine atom or iodine atom.

Examples of the compound [A] are as follows:

$$CH_2=CHCOO(CH_2)_nOCOC(CH_3)_2X$$

$$CH_2=CHCOO(CH_2)_nOCOCH(CH_3)X$$

$$CH_2=C(CH_3)COO(CH_2)_nOCOC(CH_3)_2X$$

$$CH_2=C(CH_3)COO(CH_2)_nOCOCH(CH_3)X$$

$$CH_2=CHCOOCH_2CH(CH_3)OCOC(CH_3)_2X$$

$$CH_2=CHCOOCH_2CH(CH_3)OCOCH(CH_3)X$$

These halogen-containing vinyl compounds [A] can be prepared by the ordinary esterification reactions as given below:

(1) $CH_2=CRCOOR_1OR+HOCOR_2X$

→ $CH_2=CRCOOR_1OCOR_2X$ (2) $CH_2=CRCOOR_1OH+XCOR_2X$

→ $CH_2=CRCOOR_1OCOR_2X$ (3) $CH_2=CRCOOR_1X+HOCOR_2X$

→ $CH_2=CRCOOR_1OCOR_2X$

Hydroxyalkyl (meth) acrylate for use as a starting material in the above-mentioned reaction (1), typically ω-hydroxyalkyl (meth)acrylate, includes, for example, 2-hydroxyethyl acrylate, 3-hydroxypropyl acrylate, 4-hydroxybutyl acrylate, methacrylates corresponding thereto, etc. Halogeno aliphatic carboxylic acid for use as a counterpart starting material in the reaction (1) includes, for example, halogenopropionic acid, halogenoisobutyric acid, etc., preferably 2-halogenopropionic acid and 2-halogenoisobutyric acid, where the halogen atom is a chlorine atom, bromine atom or iodine atom. Esterification reaction therebetween can be carried out with a dehydration-condensation catalyst such as p-toluenesulfonic acid, sulfuric acid, hydrochloric acid, etc.

The above-mentioned reaction (2) is carried out as a dehydrohalogenation reaction between an acid halide of halogeno aliphatic carboxylic acid and hydroxyalkyl (meth) acrylate. The above-mentioned esterification reaction (3) is carried out as a dehydrohalogenation reaction between halogenoalkyl (meth)-acrylate corresponding to hydroxyalkyl (meth)acrylate, typically ω-halogenoalkyl (meth)acrylate and halogeno aliphatic carboxylic acid.

Halogen-containing vinyl compounds as products of these esterification reactions can form cross-linkable groups as active halogen groups, when copolymerized with at least one of alkyl acrylate and alkoxyalkyl acrylate to form acrylic elastomers.

$$CH_2=CRCOOR_1R_2X \quad [B]$$

where
- R: a hydrogen atom or a methyl group,
- $R_1$: a hydrocarbon group or substituted hydrocarbon group having 0 to 10 carbon atoms, the substituent being a halogen atom, nitrile, or the like,
- $R_2$: a secondary or tertiary hydrocarbon group having 2 to 5 carbon atoms, and
- Z: a chlorine atom, bromine atom or iodine atom Examples of the compound [B] are as follows:

$$CH_2=CHCOO(CH_2)_nC(CH_3)_2X$$

$$CH_2=CHCOO(CH_2)_nCH(CH_3)X$$

$$CH_2=C(CH_3)COO(CH_2)_nC(CH_3)_2X$$

$$CH_2=C(CH_3)COO(CH_2)_nCH(CH_3)X$$

These halogen-containing vinyl compounds [B] can be prepared by esterification reaction between (meth)acrylic acid and halogenated alcohol.

$$CH_2=CROCOR_1R_2X \qquad [C]$$

where
- R: a hydrogen atom or a methyl group
- $R_1$: a hydrocarbon group or substituent hydrocarbon group having 0 to 10 carbon atoms, the substituent being a halogen atom, nitrile, or the like
- $R_2$: a secondary or tertiary hydrocarbon group having 2 to 5 carbon atoms, and
- X: a chlorine atom, bromine atom or iodine atom Examples of the compounds [C] are as follows:

$$CH_2=CHOCO(CH_2)_nC(CH_3)_2X$$

$$CH_2=CHOCO(CH_2)_nCH(CH_3)X$$

$$CH_2=C(CH_3)OCO(CH_2)_nC(CH_3)_2X$$

$$CH_2=C(CH_3)OCO(CH_2)_nCH(CH_3)X$$

These halogen-containing vinyl compounds [C] can be prepared by transesterification reaction between vinyl carboxylate ester and halogen-containing carboxylic acid (halide).

$$CH_2=CROR_1R_2X \qquad [D]$$

where
- R: a hydrogen atom or a methyl group,
- $R_1$: a hydrocarbon group or substituted hydrocarbon group having 0 to 10 carbon atoms, the substituent being a halogen atom, nitrite or the like,
- $R_2$: a secondary or tertiary hydrocarbon group having 2 to 5 carbon atmos, and
- X: a chlorine atom, bromine atom or iodine atom Examples of the compound [D] are as follows:

$$CH_2=CHO(CH_2)_nC(CH_3)_2X$$

$$CH_2=CHO(CH_2)_nCH(CH_3)X$$

$$CH_2=C(CH_3)O(CH_2)_nC(CH_3)_2X$$

$$CH_2=C(CH_3)O(CH_2)_nCH(CH_3)X$$

These halogen-containing vinyl compounds [D] can be prepared by transetherification reaction between lower alkyl vinyl ether and halogen-containing alcohol.

$$CH_2=CRR_1R_2X \qquad [E]$$

where
- R: a hydrogen atom or a methyl group,
- $R_1$: a hydrocarbon group or substituted hydrocarbon group having 1 to 16 carbon atoms, the substituent being a halogen atom, nitrile, or the like,
- $R_2$: a secondary or tertiary hydrocarbon group having 2 to 5, and
- X: a chlorine atom, bromine atom or iodine atom Examples of the compounds [E] are as follows:

$$CH_2=CH(CH_2)_nC(CH_3)_2X$$

$$CH_2=CH(CH_2)_nCH(CH_3)X$$

$$CH_2=C(CH_3)(CH_2)_nC(CH_3)_2X$$

$$CH_2=C(CH_3)(CH_2)_nCH(CH_3)X$$

$$CH_2=CH(CH_2)_nC_6H_4C(CH_3)_2X$$

$$CH_2=CH(CH_2)_nC_6H_4CH(CH_3)X$$

$$CH_2=C(CH_3)(CH_2)_nC_6H_4C(CH_3)_2X$$

$$CH_2=C(CH_3)(CH_2)_nC_6H_4CH(CH_3)X$$

These halogen-containing vinyl compounds [E] can be prepared by alkylation reaction between olefin compound and dihalogen compound.

$$CH_2=CRCH_2OCOR_1R_2X \qquad [F]$$

where
- R: a hydrogen atom or a methyl group,
- $R_1$: a hydrocarbon group or substituted hydrocarbon group having 0 to 10 carbon atoms, the substituent being a halogen atom, nitrile, or the like,
- $R_2$: a secondary or tertiary hydrocarbon group having 2 to 5 carbon atoms, and
- X: a chlorine atom, bromine atom or iodine atom Examples of the compounds [F] are as follows:

$$CH_2=CHCH_2OCO(CH_2)_nC(CH_3)_2X$$

$$CH_2=CHCH_2OCO(CH_2)_nCH(CH_3)X$$

$$CH_2=C(CH_3)CH_2OCO(CH_2)_nC(CH_3)_2X$$

$$CH_2=C(CH_3)CH_2OCO(CH_2)_nCH(CH_3)X$$

These halogen-containing vinyl compounds [I] can be prepared by esterification reaction between allyl alcohol and halogen-containing carboxylic acid (halide).

Alkyl acrylate for use in the present invention includes, for example, alkyl acrylates with an alkyl group having 1 to 8 carbon atoms (including a substituent such as a cyano group, etc.) such as methyl acrylate, ethyl acrylate, n- or iso-propyl acrylate, n- or iso-butyl acrylate, n-amyl acrylate, n-hexyl acrylate, 2-ethylhexyl acrylate, n-octyl acrylate, 2-cyanoethyl acrylate, etc. Preferably, ethyl acrylate and n-butyl acrylate can be used.

Alkoxyalkyl acrylate for use in the present invention includes, for example, alkoxyalkyl acrylates with an alkoxyalkyl group having 2 to 8 carbon atoms such as methoxymethyl acrylate, ethoxymethyl acrylate, 2-methoxyethyl acrylate, 2-ethoxyethyl acrylate, 2-butoxyethyl acrylate, etc. Preferably, 2-methoxyethyl acrylate and 2-ethoxyethyl acrylate can be used.

About 60 to about 99.9% by weight, preferably about 80 to about 99% by weight, of at least one of these alkyl acrylates and alkoxyalkyl acrylates can be used in copolymerization reaction on the basis of sum total of acrylic elastomer components.

A portion, specifically not more than about 30% by weight, preferably about 1 to about 15% by weight, of at least one of alkyl acrylate and alkoxyalkyl acrylate may be substituted with other copolymerizable monomer. Such a copolymerizable comonomer includes, for example, ethylene, propylene, vinyl chloride, vinylidene chloride, acrylonitrile, acrylamide, styrene, vinyl acetate, ethyl vinyl ether, butyl vinyl ether, alkyl methacrylate, hydroxyalkyl acrylate, alkoxyalkyl methacrylate, cyclohexyl acrylate, benzyl acrylate, furfuryl acrylate, (meth)acrylate having an lactone ring-opened adduct on the side chain (JP-A 3-160008 and JP-A 6-145257).

About 0.1 to about 10% by weight, preferably about 1 to about 5% by weight, of a halogen-containing vinyl compound can be used in the copolymerization reaction therewith on the basis of sum total of the acrylic elastomer components. Below about 0.1% by weight of the halogen-containing vinyl compound, a satisfactory amount of active halogen groups, as desired in the present invention, will not be introduced into the acrylic elastomer, whereas above 10% by weight a decrease in elongation, etc. will occur.

Copolymerization reaction can be carried out in the presence of an ordinary radical polymerization initiator, preferably its redox system according to any polymerization procedure, for example, emulsion polymerization, suspension polymerization, solution polymerization, bulk polymerization, etc., preferably emulsion polymerization. Polymerization temperature is typically about 5° to about 80° C., preferably about 10° to about 60° C. Polymerization yield is about 90% or more, and thus proportion of the individual monomers used in the polymerization reaction substantially directly corresponds to the composition ratio of the resulting copolymer, i.e. acrylic elastomer. The resulting acrylic elastomer has a Mooney viscosity $ML_{1+4}$ (100° C.) of about 5 to about 100, preferably about 20 to about 60.

Acrylic elastomer resulting from copolymerization with the halogen-containing vinyl compound having a secondary or tertiary halogenoalkyl group can be vulcanized with a vulcanization system such as a polyamine system, a polyamine/base system, an alkali soap/sulfur (donor compound) system, a triazine derivative/metal oxide system, a trithiocyanuric acid/zinc dialkyldithiocarbamate system, etc., in the same manner as in the case of acrylic elastomers having other active halogen groups as cross-linkable groups. Preferably, cross-linking can be carried out by a cross-linking agent of an organic peroxide system or a mercapto group-containing compound/alkali metal carboxylate system.

Organic peroxide for use in the cross-linking includes, for example, t-butyl peroxide, dicumyl peroxide, 2,5-dimethyl-2,5-di(t-butylperoxy)hexane, 2,5-dimetyl-2,5-di(t-butylperoxy)-hexine-3,1,1-di(t-butylperoxy)-3,3,5-trimethylcyclohexane, etc. Preferably, 2,5-dimethyl-2,5-di(t-bytylperoxy)hexane and 1,1-di (t-butylperoxy)-3,3,5-trimethylycyclohexane are used. About 0.1 to about 10 parts by weight, preferably about 0.5 to about 5 parts by weight, of the organic peroxide is used per 100 parts by weight of the acrylic elastomer.

When an organic peroxide is used as a cross-linking agent, it is preferable to use jointly a cocross-linking agent of polyfunctional unsaturated compound. Polyfunctional unsaturated compound includes, for example, ethyleneglycol di-(meth)acrylate, propyleneglycol di(meth)acrylate, triallyl (iso)cyanurate, trimethylolpropane tri(meth)acrylate, triallyl trimellitate, etc. About 0.1 to about 10 parts by weight, preferably about 0.5 to about 5 parts by weight, of the cocross-linking agent is used per 100 parts by weight of the acrylic elastomer. Below about 0.1 parts by weight, neither satisfactory vulcanization rate nor satisfactory properties of vulcanization products will be obtained, whereas above about 10 parts by weight the elongation will be considerably lowered.

Mercapto group-containing compound for use as a cross-linking agent of mercapto group-containing compound/alkali metal carboxylate system includes, for example, compounds having a thiol group, a thiocarboxyl group, a thiophenol group or the like, such as 1,6-dimercaptohexane, dimercaptodiethyl ether, 1,5-dimercaptonaphthalene, 2,7-dimercaptonaphthalene, 2-dibutylamino-4,6-dithiol-s-triazine, 2,4,6-trimercapto-s-triazine, 3,4-dimercaptotoluene, etc. About 0.2 to about 10 parts by weight, preferably about 0.5 to about 5 parts by weight, of the mercapto group-containing compound is used per 100 parts by weight of the acrylic clastomer.

Alkali metal carboxylate for use as a cross-linking agent of mercapto group-containing compound/alkali metal carboxylate system includes, for example, lithium salts, potassium salts and sodium salts of saturated fatty acids having 1 to 18 carbon atms, unsaturated fatty acids having 3 to 18 carbon atoms, aliphatic dicarboxylic acids, aromatic carboxylic acids, etc., more specifically, potassium stearate, sodium stearate, potassium oleate, sodium oleate, sodium 2-ethylhexanoate, sodium tartrate, sodium propionate, sodium acetate, etc. About 0.5 to about 20 parts by weight, preferably about 1 to about 10 parts by weight, of the alkali metal carboxylate is used per 100 parts by weight of the acrylic elastomer.

An acrylic elastomer composition containing the acrylic elastomer and various cross-linking agent can be prepared, after further addition thereto of an acid acceptor of divalent metal oxide or hydroxide, a phenol, thiol or sulfine for adjusting vulcanization reversion, a reinforcing agent or filler of, typically, carbon black, a lubricant of stearic acid or the like, a plasticizer, etc., as desired, by kneading in an open roll mixer, a Banbury mixer, a kneader, or the like. Its vulcanization can be carried out by press vulcanization (primary vulcanization) at about 150° to about 200° C. for about 0.5 to 15 minutes and, if required, by further gear-oven vulcanization (secondary vulcanization) at about 120° to about 180° C. for about 1 to about 20 hours.

The present acrylic elastomer can be cross-linked not only alone, but cocross-linked also in a blend state with a specific fluorine-containing elastomer (fluorine rubber) or a dienic clastomer, which are both cross-linkable with an organic peroxide, followed by vulcanization-molding thereof.

Fluorine-containing elastomer cross-linkable with an organic peroxide is fluorine-containing elastomers having at least one of iodine and bromine in the molecule. Such fluorine-containing elastomers can be readily obtained by homopolymerization or copolymerization of fluorine-containing olefins in the presence of various iodine and bromine-containing compounds, iodine-containing compounds or bromine-containing compounds. Its detail is disclosed, for example, in JP-A 7-292198 for the invention made by the present applicants.

The peroxide cross-linkable fluorine-containing elastomer and the present acrylic elastomer can be used upon blending in a ratio by weight of the former to the latter of about 5 to about 95: about 95 to about 5, preferably about 20 to 80: about 80 to about 20.

Dienic elastomer cross-linkable with an organic peroxide includes, for example, hydrogenated NBR, NBR, EPDM (ethylene/propylene/diene series copolymer rubber), etc. Preferably, hydrogenated NBR is used. The dienic elastomer cross-linkable with the peroxide can be used in a proportion of about 0.1 to about 50% by weight, preferably about 0.5 to about 50% by weight, on the basis of a blend with the acrylic elastomer.

The present invention provides an acrylic clastomer copolymerized with a halogen-containing vinyl compound having a secondary or tertiary halogen alkyl group, which has an accelerated vulcanization speed, as compared with acrylic elastomers having other active halogen groups as cross-linkable groups. Thus, the vulcanization can be carried out with a higher speed in a short time. Due to a higher torque, shapability of the vulcanization molding products can be improved, and thus the products are readily available in a short time. The present acrylic elastomer can be also cocross-linked upon blending with a specific fluorine-containing clastomer or dienic elastomer cross-linkable with an organic peroxide.

PREFERRED EMBODIMENTS OF THE INVENTION

Figure 1:
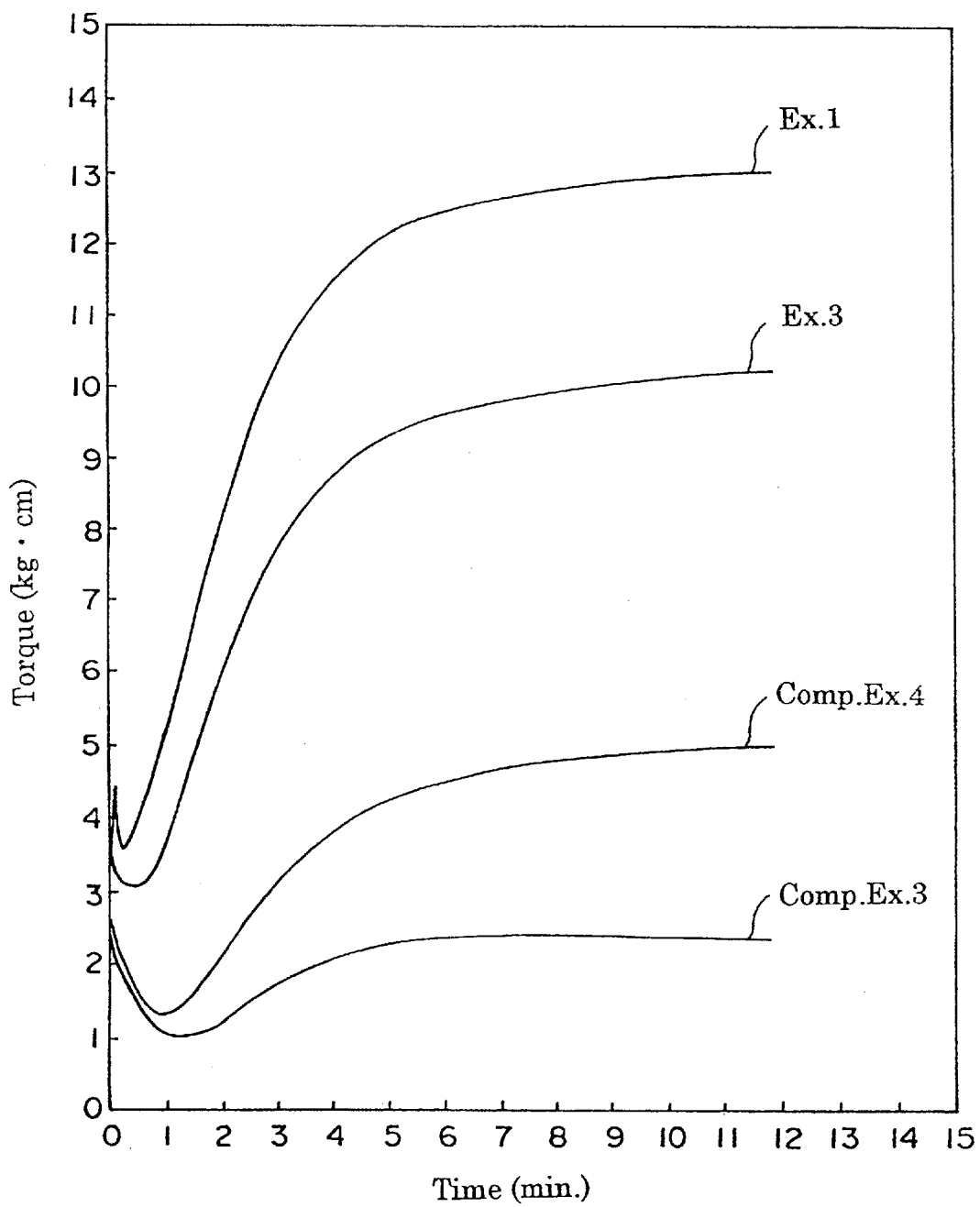
FIG. 1 is a graph showing vulcanization torque curves obtained in Examples 1 and 3 and Comparative Examples 3 and 4.

The present invention will be described in detail below, referring to Examples.

REFERENCE EXAMPLE 1

100 g of 2-bromoisobutyric acid, 600 ml of toluene and 1.7 g of p-toluenesulfonic acid were charged into a 500-ml, three-necked flask provided with a stirrer, a dropping funnel and a reflux condenser and heated to 120° C., and 72 g of 4-hydroxybutyl acrylate was dropwise added thereto with stirring. Dropwise addition was carried out by monitoring the amount of water formed by the esterification reaction and controlling the rate of dropwise addition. After the end of reaction, water was added to the reaction mixture, and the organic layer was extracted with diethyl ether, and the extract was neutralized with sodium hydrogen carbonate, washed with water and dried over anhydrous magnesium sulfate. By distilling off the solvent and purification by silica gel column chromatography, 98 g of the desired compound having the following chemical formula and NMR properties was obtained (yield: 67%):

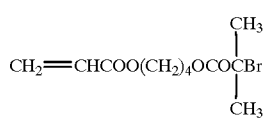

$^1$H-NMR(TMS, CDCl$_3$):
5.8~6.4 ppm (C$\underline{H}_2$=C$\underline{H}$—)
4.2 ppm (—COOC$\underline{H}_2$—)
2.0 ppm(—C$\underline{H}_3$)
1.8 ppm (-COOCH$_2$C$\underline{H}_2$—)

REFERENCE EXAMPLE 2

In Reference Example 1, 92 g of 2-bromopropionic acid was used in place of 2-bromoisobutyric acid, and the desired compound having the following chemical formula and NMR properties was obtained (yield: 85%):

$^1$H-NMR (TMS, CDCl$_3$):
5.8~6.4 ppm (C$\underline{H}_2$=C$\underline{H}$—)

4.4ppm (—OCOC$\underline{H}$—) with CH$_3$ substituent 4.2 ppm (—COOC$\underline{H}_2$—)
1.8 1.9 ppm (—COOCH$_2$C$\underline{H}_2$—)
1.8~1.9 ppm (—C$\underline{H}_3$)

REFERENCE EXAMPLE 3

72 g of 4-hydroxybutyl acrylate and 47 g of pyridine were charged into a 500-ml, three-necked flask provided with a stirrer, a dropping funnel and a reflux condenser, and cooled to not more than 10° C. Then, 63 g of 2-chloropropionic acid chloride was dropwise added thereto, while keeping the reaction temperature not more than 10° C. After the end of reaction, the reaction mixture was treated in the same manner as in Example 1, whereby 105 g of the desired compound having the following chemical formula and NMR properties was obtained (yield: 79%):

$^1$H-NMR (TMS, CDCl$_3$):
5.8~6.4 ppm (C$\underline{H}_2$=C$\underline{H}$—)

4.4ppm (—OCOC$\underline{H}$—) with CH$_3$ substituent 4.2 ppm (—COOC$\underline{H}_2$—)
1.8~1.9 ppm (-COOCH$_2$C$\underline{H}_2$—)
1.8~1.9 ppm (—C$\underline{H}_3$)

EXAMPLE 1

The following compounds were charged into a separable flask provided with a stirrer, a thermometer and a nitrogen gas inlet tube, and subjected to copolymerization reaction at 40° C. for 2 hours after the reactor vessel was fully flushed with a nitrogen gas:

| | |
|---|---|
| Ethyl acrylate | 96.5 parts by wt. |
| CH$_2$=CHCOO(CH$_2$)$_4$OCOC(CH$_3$)$_2$Br | 3.5 parts by wt. |
| Sodium lauryl sulfate | 5.5 parts by wt. |
| Organic peroxide (Perbutyl H-69, commercially available from Nihon Yushi K. K., Japan) | 0.005 parts by wt. |
| Formaldehyde sulfoxylic acid.dihydrate (Rongarit, commercially available from Kanto Kaguku K. K., Japan) | 0.01 parts by wt. |

-continued

| | |
|---|---|
| Ferrous sulfate | 0.0005 parts by wt. |
| Water | 200 parts by wt. |

The polymerization reaction rapidly proceeded after addition of a polymerization initiator. The reaction mixture was salted out, thoroughly washed with water and dried, whereby acrylic elastomer A having a Mooney viscocity $ML_{1+4}$ (100° C.) of 23.2 was obtained with polymerization yield of 95%.

The following compounds were added to 100 parts by weight of the acrylic elastomer A and kneaded in an open roll:

| | |
|---|---|
| FEF carbon black | 60 parts by wt. |
| Stearic acid | 1 parts by wt. |
| Organic peroxide (Peroxymon F-40, commercially available from Nihon Yushi K. K., Japan) | 3.95 parts by wt. |
| Triallyl isocyanurate | 6 parts by wt. | the kneaded product was subjected to determination of vulcanization torque at 180° C., whereby a vulcanization torque curve shown in FIG. 1 was obtained.

EXAMPLE 2

The following compounds were subjected to kneading and determination of vulcanization torque in the same manner as in Example 1:

| | |
|---|---|
| Acrylic elastomer A | 100 parts by wt. |
| FEF carbon black | 60 parts by wt. |
| Stearic acid | 1 parts by wt. |
| 2,4,6-trimercapto-s-triazine (TCY, commercially available from Nippon Zeon K. K., Japan) | 0.5 parts by wt. |
| Sodium stearate (NS soap, commercially available from Koa K. K., Japan) | 2 parts by wt. |

Figure 2:
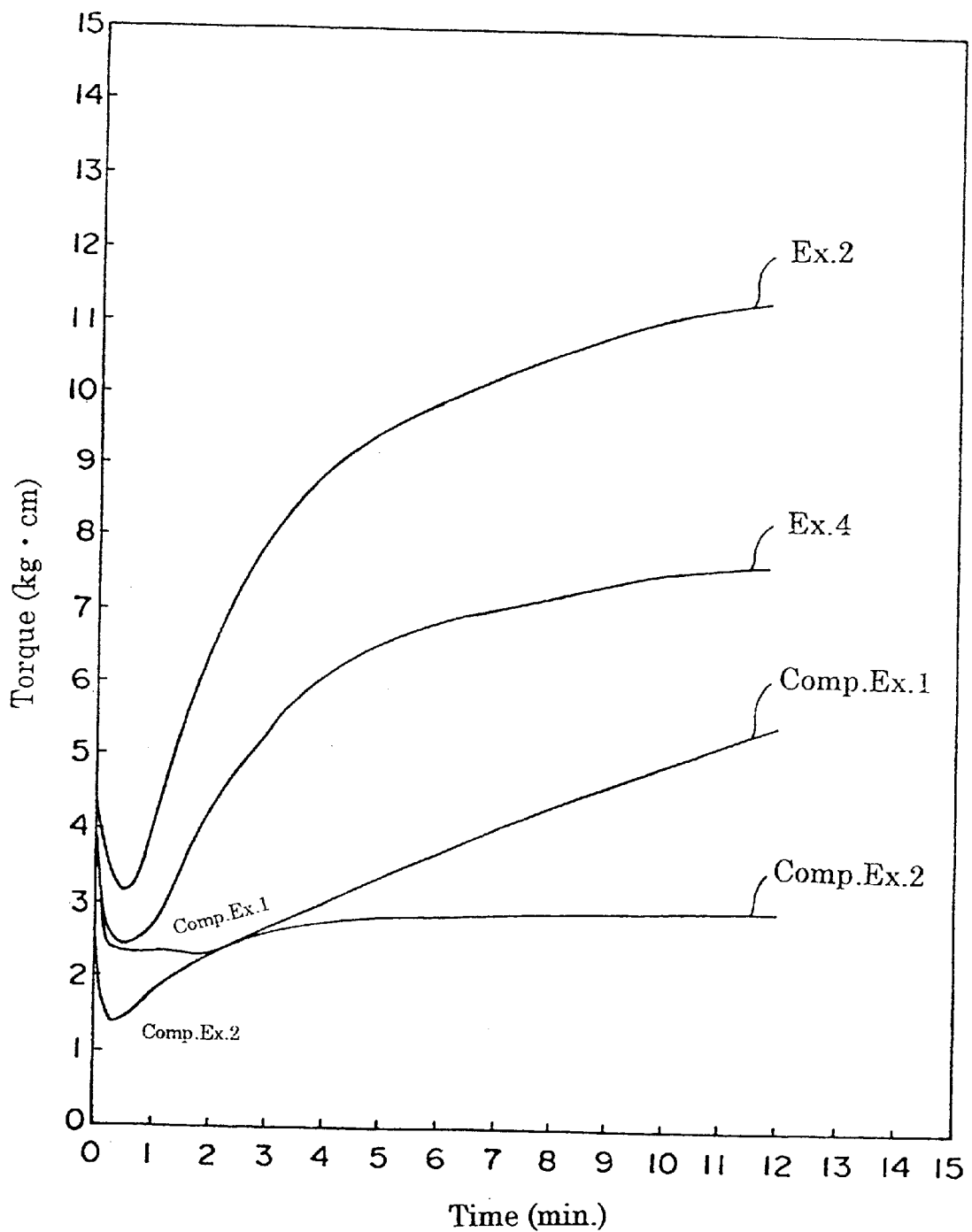
FIG. 2 is a graph showing vulcanization torque curves obtained in Examples 2 and 4 and Comparative Examples 1 and 2.

A vulcanization torque curve shown in FIG. 2 was obtained.

EXAMPLE 3

In Example 1, the same amount of $CH_2=CHCOO(CH_2)_4OCOCH(CH_3)$ Br was used in place of $CH_2=CHCOO(CH_2)_4OCOC(CH_3)_2Br$ to prepare an acrylic elastomer B having a Mooney viscocity $ML_{1+4}$ (100° C.) of 64.8. With this acrylic elastomer B, kneading and determination of vulcanization torque were carried out in the same manner as in Example 1.

A vulcanization torque curve shown in FIG. 1 was obtained.

EXAMPLE 4

In Example 1, the same amount of $CH_2=CHCOO(CH_2)_4OCOCH(CH_2)$ Cl was used in place of $CH_2=CHCOO(CH_2)_4OCOC(CH_3)_2Br$ to prepare an acrylic elastomer C having a Mooney viscocity $ML_{1+4}$ (100° C.) of 48. With this acrylic elastomer C, kneading and determination of vulcanization torque were carried out in the same manner as in Example 1. A vulcanization torque curve shown in FIG. 2 was obtained.

COMPARATIVE EXAMPLE 1

In Example 1, the amount of ethyl acrylate was changed to 98.6 parts by weight and 1.4 parts of $CH_2=CHO(CH_2)_2Cl$ was used in place of $CH_2=CHCOO(CH_2)_4OCOC(CH_3)_2Br$ to prepare an acrylic elastomer D having a Mooney viscosity $ML_{1+4}$ (100° C.) of 53. With this acrylic elastomer D, kneading and determination of vulcanization torque were carried out in the same manner as in Example 1. A vulcanization torque curve shown in FIG. 2 was obtained.

COMPARATIVE EXAMPEL 2

In Example 2, the acrylic elastomer D was used in place of the acrylic elastomer A, and kneading and determination of vulcanization torque were carried out in the same manner as in Example 2. A vulcanization torque curve shown in FIG. 2 was obtained.

COMPARATIVE EXAMPLE 3

In Example 1, the amount of ethyl acrylate was changed to 97.5 parts by weight and 2.5 parts by weight of $CH_2CHCOO(CH2)_2Br$ was used in place of $CH_2=CHCOO(CH_2)_4OCOC(CH_3)_2Br$ to prepare an acrylic elastomer E having a Mooney viscosity $ML_{1+4}$ (100° C.) of 45.7. With this acrylic elastomer E, kneading and determination of vulcanization torque were carried out in the same manner as in Example 1. A vulcanization torque curve shown in FIG. 1 was obtained.

COMPARATIVE EXAMPLE 4

In Example 1, the amount of ethyl acrylate was changed to 96.5 parts by weight and 3.5 parts of $CH_2=CHCOO(CH_2)_2OCOCH_2Br$ was used in place of $CH_2=CHCOO(CH_2)_4OCOC(CH_3)_2Br$ to prepare an acrylic elastomer F having a Mooney viscosity $ML_{1+4}$ (100° C.) of 46.6. With this acrylic elastomer F, kneading and determination of vulcanization torque were carried out in the same manner as in Example 1. A vulcanization torque curve shown in FIG. 1 was obtained.

What is claimed is:

1. A vulcanizable acrylic elastomer composition, which comprises:

I. an acrylic elastomer obtained by copolymerization of:
  a) about 60 to about 99.9% by weight of at least one of alkyl acrylate and alkoxyalkyl acrylate;
  b) about 10 to about 0. 1% by weight of a halogen-containing vinyl compound selected from the group consisting of compounds represented by the following general formulas:

where R is a hydrogen atom or a methyl group; $R_1$ is a hydrocarbon group or a substituted hydrocarbon group having 1 to 10 carbon atoms, the substituent being a halogen atom or a nitrile group; $R_2$ is a secondary or tertiary hydrocarbon group having 2 to 5 carbon atoms; and X is a chlorine atom, bromine atom or iodine atom;

where R is a hydrogen atom or a methyl group; $R_1$ is a hydrocarbon group or a substituted hydrocarbon group having 1 to 10 carbon atoms, the substituent being a halogen atom or a nitrile group; $R_2$ is a secondary or tertiary hydrocarbon group having 2 to 5 carbon atoms; and X is a chlorine atom, bromine atom or iodine atom;

$$CH_2=CROCOR_1R_2X$$

where R is a hydrogen atom or a methyl group; $R_1$ is a hydrocarbon group or a substituted hydrocarbon group having 1 to 10 carbon atom, the substituent being a halogen atom or a nitrile group; $R_2$ is a secondary or tertiary hydrocarbon group having 2 to 5 carbon atoms; and X is a chlorine atom, bromine atom or iodine atom;

$$CH_2=CROR_1R_2X$$

where R is a hydrogen atom or a methyl group; $R_1$ is a hydrocarbon group or a substituted hydrocarbon group having 1 to 10 carbon atoms, the substituent being a halogen atom or a nitrile group; $R_2$ is a secondary or tertiary hydrocarbon group having 2 to 5 carbon atoms; and X is a chlorine atom, bromine atom or iodine atom;

$$CH_2=CRR_1R_2X$$

where R is a hydrogen atom or a methyl group; $R_1$ is a hydrocarbon group or substituted hydrocarbon group having 1 to 16 carbon atoms, the substituent being a halogen atom or a nitrile group; $R_2$ is a secondary or tertiary hydrocarbon group having 2 to 5 carbon atoms; and X is a chlorine atom, bromine atom or iodine atom; or $$CH_2=CRCH_2OCOR_1R_2X$$

where R is a hydrocarbon atom or a methyl group; $R_1$ is a hydrocarbon group or a substituted hydrocarbon group having 1 to 10 carbon atoms, the substituent being a halogen atom or a nitrile group; $R_2$ is a secondary or tertiary hydrocarbon group having 2 to 5 carbon atoms; and X is a chlorine atom, bromine atom or iodine atom; and c) about 30 to about 0% by weight of a monomer copolymerizable with the acrylate and the vinyl compound, sum total being 100% by weight;

II. an organic peroxide; and

III. a polyfunctional unsaturated compound.

2. A vulcanizable acrylic elastomer composition according to claim 1, wherein about 0.1 to about 10 parts by weight of the cocross-linking agent is used per 100 parts by weight of the acrylic elastomer.

* * * * *